US011731626B2

(12) United States Patent
Tanaka (10) Patent No.: US 11,731,626 B2
(45) Date of Patent: Aug. 22, 2023

(54) IN-VEHICLE SYSTEM (71) Applicant: HITACHI AUTOMOTIVE SYSTEMS, LTD., Hitachinaka (JP)

(72) Inventor: Hiroaki Tanaka, Hitachinaka (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 341 days.

(21) Appl. No.: 17/268,811

(22) PCT Filed: Jul. 25, 2019

(86) PCT No.: PCT/JP2019/029154
§ 371 (c)(1),
(2) Date: Feb. 16, 2021

(87) PCT Pub. No.: WO2020/039839
PCT Pub. Date: Feb. 27, 2020

(65) Prior Publication Data
US 2021/0323553 A1 Oct. 21, 2021

(30) Foreign Application Priority Data
Aug. 23, 2018 (JP) ................. 2018-156576

(51) Int. Cl.
B60W 30/165 (2020.01)
H04W 4/44 (2018.01)
(Continued)

(52) U.S. Cl.
CPC .... B60W 30/165 (2013.01); B60W 30/18154 (2013.01); B60W 50/14 (2013.01);
(Continued)

(58) Field of Classification Search
CPC ......... B60W 30/165; B60W 30/18154; B60W 50/14; B60W 2552/53; B60W 2556/60;
(Continued)

(56) References Cited

U.S. PATENT DOCUMENTS

2012/0226392 A1* 9/2012 Kataoka ............... G06V 20/588
701/1
2018/0362044 A1 12/2018 Iihoshi

FOREIGN PATENT DOCUMENTS

JP H11-175897 A 7/1999
JP 2009-163434 A 7/2009
(Continued)

OTHER PUBLICATIONS

Translation of JP 11-175897 A to Hiroto (Year: 1999).*
(Continued)

Primary Examiner — Kenneth J Malkowski
(74) Attorney, Agent, or Firm — Foley & Lardner LLP (57) ABSTRACT Provided is an in-vehicle system in which an own vehicle does not decelerate according to a preceding vehicle even if the preceding vehicle changes lanes to the right turn lane or the left turn lane and decelerates after own vehicle entering an intersection area. A CPU 107 (first control unit) controls the own vehicle to follow the preceding vehicle. An image processing circuit 106 (detection unit) detects a lane marking of the traveling lane. The CPU 107 (determination unit) determines whether an own vehicle 201 has entered the intersection area. When the detection of one of the right and left lane markings of the traveling lane is interrupted (S20: YES) after the own vehicle 201 has entered the intersection area (S15: YES), the CPU 107 (second control unit) releases ACC that causes the own vehicle 201 to follow the preceding vehicle 202.

6 Claims, 8 Drawing Sheets

CASE OF RIGHT TURNING VEHICLE (EMBODIMENT OF PRESENT INVENTION)

(51) Int. Cl.
- *B60W 30/18* (2012.01)
- *B60W 50/14* (2020.01)
- *G06V 20/58* (2022.01)
- *G06V 20/56* (2022.01)

(52) U.S. Cl.
CPC .......... *G06V 20/584* (2022.01); *G06V 20/588* (2022.01); *H04W 4/44* (2018.02); *B60W 2050/143* (2013.01); *B60W 2050/146* (2013.01); *B60W 2552/53* (2020.02); *B60W 2556/60* (2020.02)

(58) Field of Classification Search
CPC ............... B60W 30/16; B60W 30/162; B60W 40/1005; G06V 20/588; G08G 1/22; G05D 1/0291; G05D 1/0293; G05D 1/0295; B62D 37/02; B60K 2310/26; B60K 2310/262; B60K 2310/264; G01S 2013/9325

See application file for complete search history.

(56) References Cited

FOREIGN PATENT DOCUMENTS

| | | |
|---|---|---|
| JP | 2017-172522 A | 9/2017 |
| WO | WO-2011/064825 A1 | 6/2011 |

OTHER PUBLICATIONS

International Search Report with English translation and Written Opinion issued in corresponding application No. PCT/JP2019/029154 dated Nov. 26, 2019.

* cited by examiner

IDENTIFICATION OF INTERSECTION AREA

IN-VEHICLE SYSTEM

TECHNICAL FIELD

The present invention relates to an in-vehicle system.

BACKGROUND ART

One of the autonomous driving technologies is follow-up driving (hereinafter, referred to as ACC=Adaptive Cruise Control) (for example, see Patent Literature 1). The ACC is a control technology that travels while keeping the distance to the preceding vehicle constant. The ACC enables the own vehicle to travel while keeping the distance between the own vehicle and the preceding vehicle constant.

This ACC control uses a technique such as detecting the white line from the images of the left and right traveling lanes reflected on the camera while measuring the distance to the preceding vehicle with a sensor such as radar, which causes the own vehicle to move forward without colliding with the preceding vehicle and departing from the traveling lane.

CITATION LIST

Patent Literature

PTL 1: JP 2017-172522 A

SUMMARY OF INVENTION

Technical Problem

Figure 5:
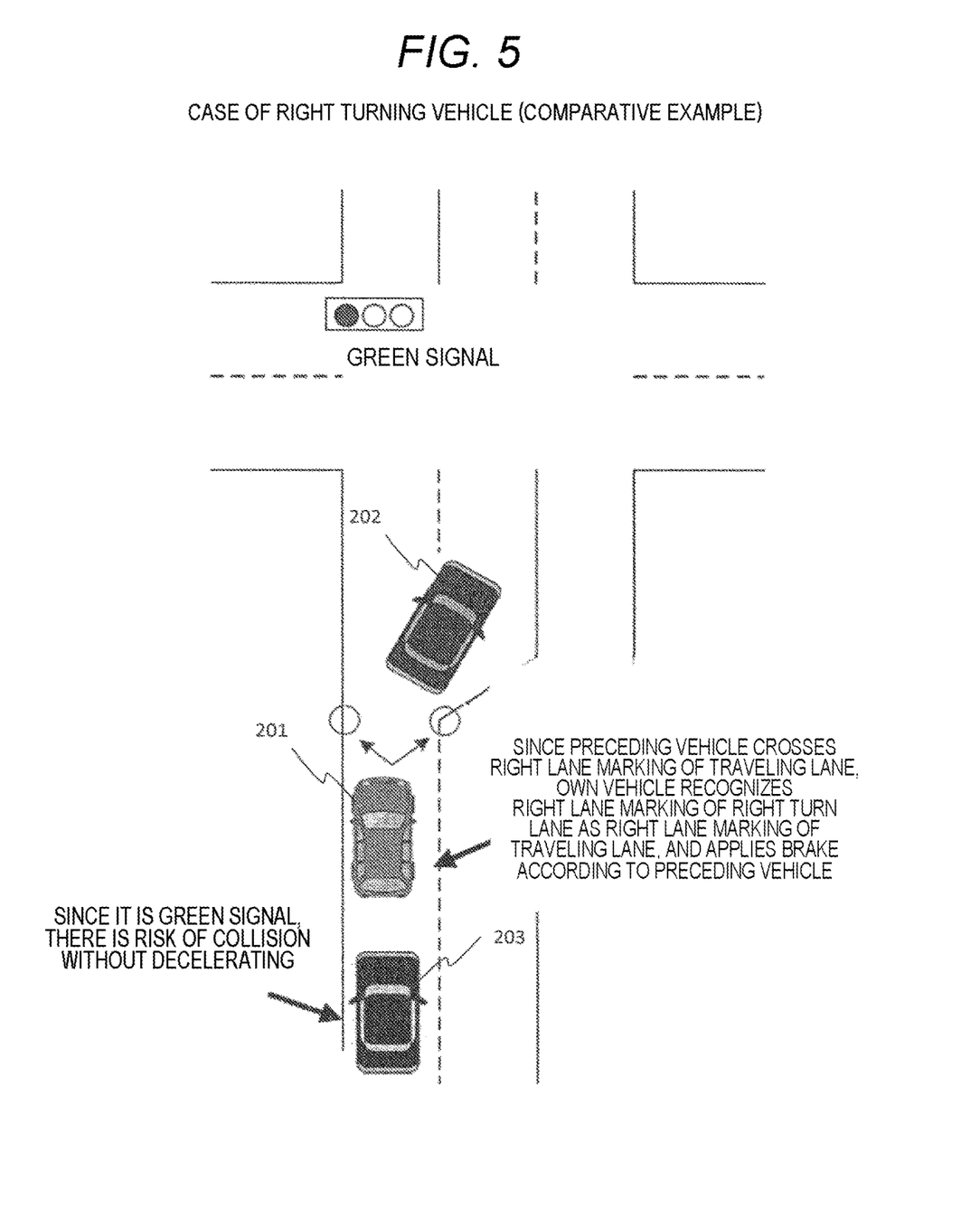
FIG. 5 is a diagram for explaining vehicle control according to a comparative example when the preceding vehicle turns right.

However, as illustrated in FIG. 5, when the preceding vehicle makes a right turn while decelerating on a road where the right turn lane branches off from the straight lane at an intersection, the vehicle enters the right turn lane across the right lane marking of the straight lane. The branch (increase) of the right turn lane as the lane information cannot be recognized, and the own vehicle adjusts to the deceleration behavior of the preceding vehicle. In this case, the lane of the own vehicle decelerates even at a green signal, so there is a concern that the following vehicle may collide.

An object of the invention is to provide an in-vehicle system in which an own vehicle does not decelerate according to a preceding vehicle even if the own vehicle changes lanes to the right turn lane or the left turn lane and decelerates after entering an intersection area.

Solution to Problem

In order to achieve the above object, the invention includes a first control unit that controls a own vehicle to follow a preceding vehicle, a detection unit that detects a lane markings of a traveling lane, a determination unit that determines whether the own vehicle has entered an intersection area, and a second control unit that, when detection of one of right and left lane markings of the traveling lane is interrupted after the own vehicle has entered the intersection area, control for causing the own vehicle to follow the preceding vehicle is released.

Advantageous Effects of Invention

According to the invention, even if an own vehicle has entered an intersection area and then a preceding vehicle changes lanes to the right turn lane or the left turn lane and decelerates, the own vehicle does not decelerate in accordance with the preceding vehicle. Objects, configurations, and effects besides the above description will be apparent through the explanation on the following embodiments.

DESCRIPTION OF EMBODIMENTS

Hereinafter, the configuration and operation of the in-vehicle system according to the embodiment of the invention will be described with reference to the drawings.

Specifically, the in-vehicle system is a system that performs Adaptive Cruise Control (ACC).

Further, the same symbols in the drawings indicate the same portion.

EXAMPLE

Figure 1:
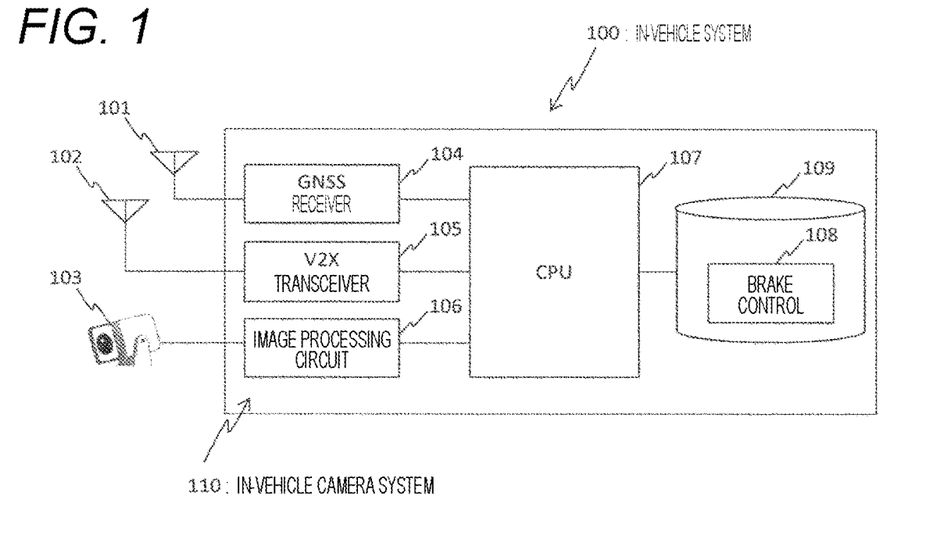
FIG. 1 is a block diagram illustrating a configuration of an in-vehicle system according to an embodiment of the invention.

FIG. 1 illustrates an in-vehicle system 100 according to an embodiment of the invention. The in-vehicle system 100 includes a GNSS antenna 101, a V2X antenna 102, a camera 103, a GNSS receiver 104, a V2X transceiver 105, an image processing circuit 106, a Central Processing Unit (CPU) 107, a brake control 108, and the like. The brake control 108 is a predetermined program and is stored in a storage device 109 such as a memory.

The GNSS antenna 101 receives radio waves from a satellite and converts the received radio waves into RF signals. The RF signal is input to the GNSS receiver 104. The GNSS receiver 104 calculates the latitude and longitude of the position of the own vehicle based on the RF signal, and inputs the calculated latitude and longitude to the CPU 107. In other words, the GNSS receiver 104 (first receiver) calculates the position of the own vehicle based on the radio wave received from the satellite.

The V2X antenna 102 receives radio waves from communication devices provided on roads, vehicles, pedestrians, and the like, and converts the received radio waves into RF signals. The RF signal is input to the V2X transceiver. Here, V2X is a general term for Vehicle to Vehicle ((V2V: vehicleto-vehicle communication)/Infrastructure (V2I: road-to-vehicle communication)/Pedestrian (V2P: pedestrian-to-vehicle communication)).

In a vehicle-to-vehicle communication, two-way communication is performed between an in-vehicle unit of the own vehicle and a roadside unit installed at the intersection. The in-vehicle unit is configured by the V2X antenna 102, the V2X transceiver 105, and the like. In this embodiment, in particular, the in-vehicle unit receives "green/yellow/red" signal information and latitude/longitude information of the roadside unit (intersection) from the roadside unit, and inputs the received information to the CPU 107. In other words, the V2X transceiver 105 (second receiver) receives intersection position information indicating the position of the intersection from the roadside device.

The in-vehicle camera system configured by the camera 103 and the image processing circuit 106 particularly obtains traveling lane information in the forward traveling direction and inputs the acquired information to the CPU 107.

Here, the image processing circuit 106 detects the lane marking (boundary line) of the traveling lane from the image captured by the camera 103. That is, the image processing circuit 106 functions as a detection unit that detects a lane marking of the traveling lane. If the lane information can be obtained, it does not necessarily have to be a camera. The CPU 107 executes the brake control 108 based on various input data.

Next, brake control will be described with reference to FIGS. 2 to 5. The own vehicle 201, which is following a preceding vehicle 202 by the ACC function, is always traveling while maintaining a constant inter-vehicle distance.

Figure 2:
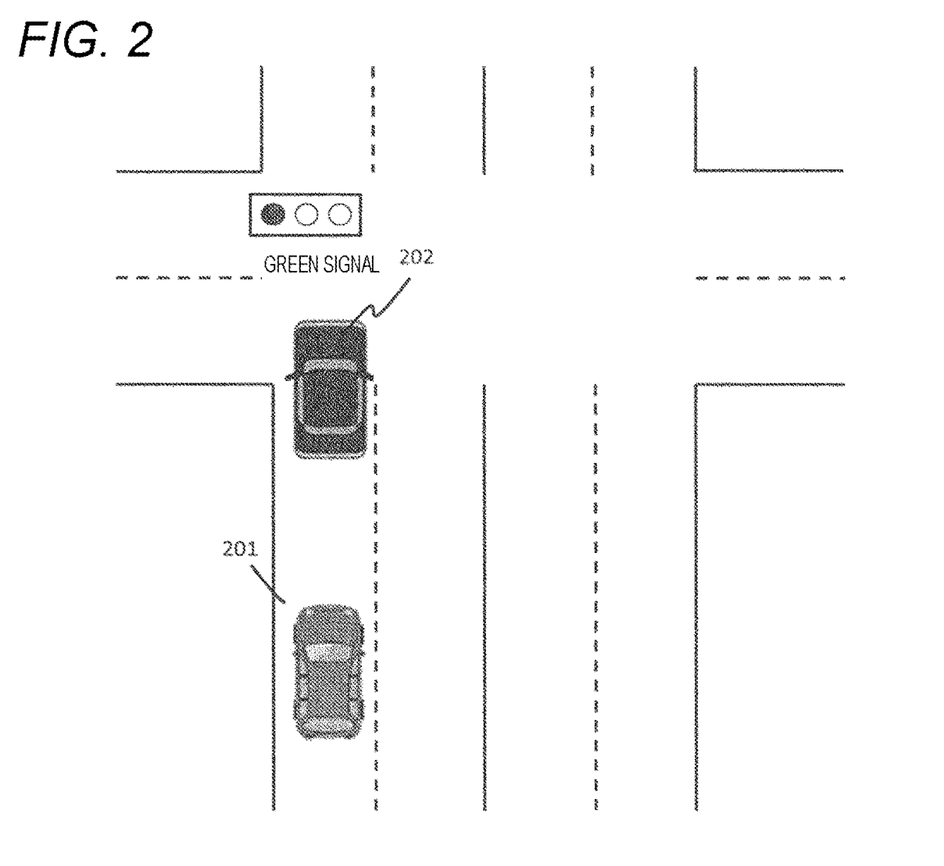
FIG. 2 is a diagram for explaining vehicle control when an own vehicle and a preceding vehicle traveling in the same lane enter an intersection at a green signal.

When the own vehicle 201 and the preceding vehicle 202 enter the intersection, the own vehicle 201 behaves according to the preceding vehicle 202. Therefore, when the intersection signal (traffic signal) is "green" as illustrated in FIG. 2, the own vehicle 201 passes through the intersection while maintaining a certain distance from the preceding vehicle 202.

Figure 3:
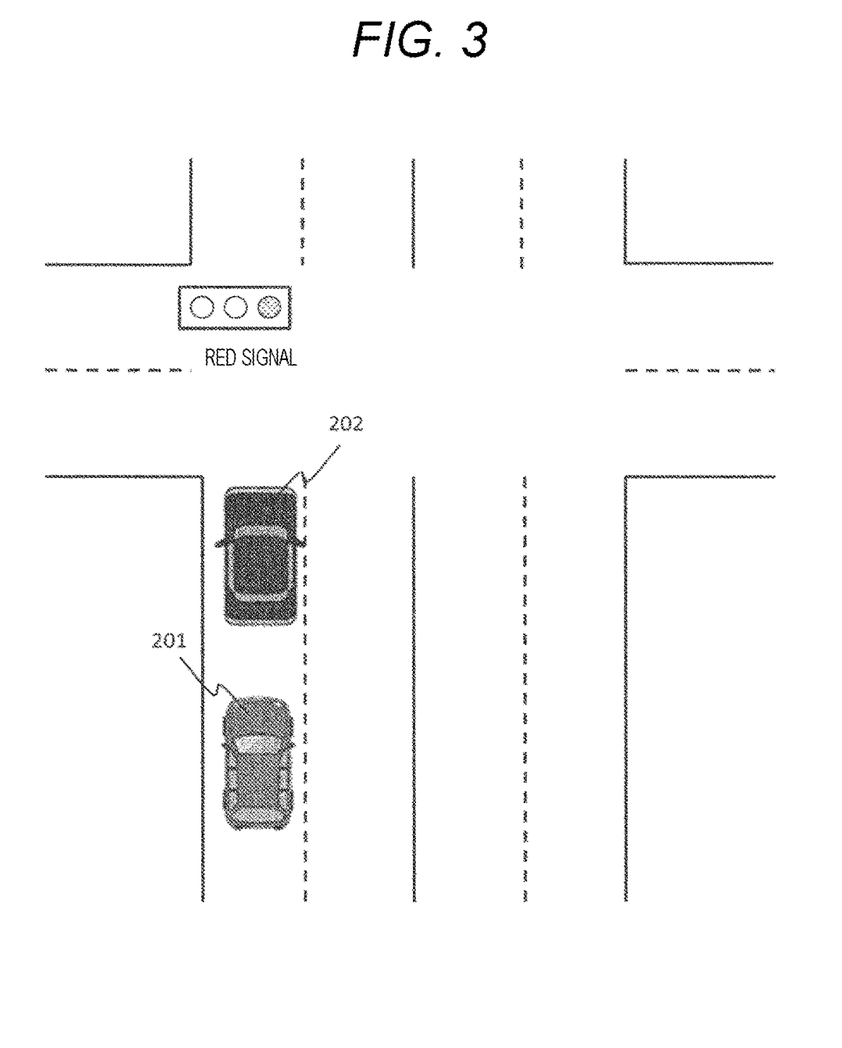
FIG. 3 is a diagram for explaining vehicle control when the own vehicle and the preceding vehicle traveling in the same lane enter an intersection at a red signal.

On the other hand, as illustrated in FIG. 3, when the intersection signal is "red" or the like, the own vehicle 201 also brakes in accordance with the preceding vehicle 202 and stops while maintaining a distance that does not cause collision. The problem here is when the preceding vehicle 202 enters the right turn lane.

Figure 4:
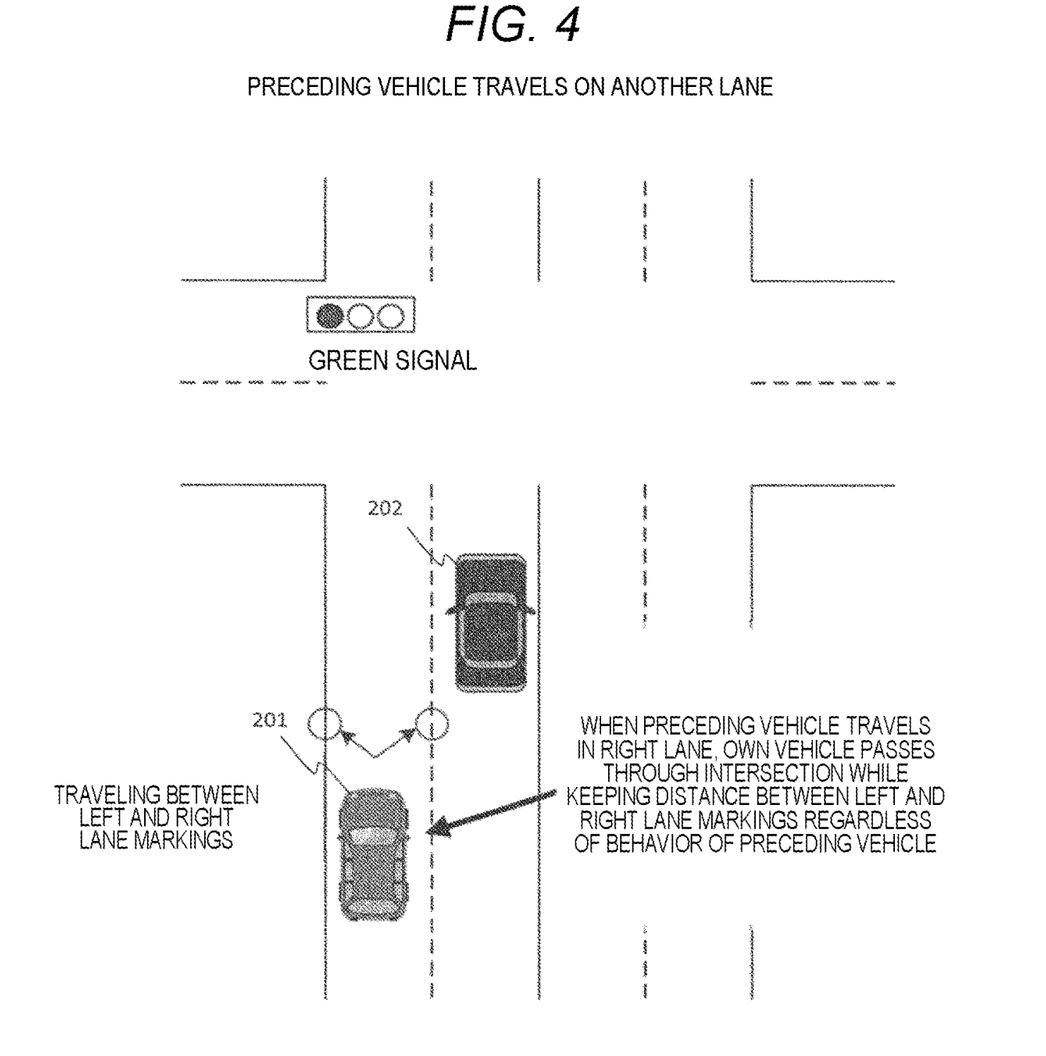
FIG. 4 is a diagram for explaining vehicle control when the own vehicle and the preceding vehicle traveling in different lanes enter an intersection at a green signal.

As illustrated in FIG. 4, when the preceding vehicle 202 is traveling in a different lane (in this case, the lane on the right side), the own vehicle 201 is controlled and travels between the left and right lane markings recognized by the camera 103 or the like regardless of the behavior of the preceding vehicle 202, and passes through the intersection of the "green" signal.

However, as illustrated in FIG. 5, when the preceding vehicle 202 makes a right turn, the preceding vehicle 202 crosses the right lane marking of the straight lane in order to enter the right turn lane, so that the own vehicle 201 is not able to recognize the original right lane marking but mistakenly recognizes the right lane marking of the right turn lane as the right lane marking of the straight lane.

In this case, since the own vehicle 201 operates according to the behavior of the preceding vehicle 202 that turns right, the own vehicle 201 also decelerates even the case of the "green" signal according to the preceding vehicle 202 that decelerates and stops in order to wait for a right turn. However, since a following vehicle 203 does not decelerate because the intersection signal is "green", there is a concern that the own vehicle 201 will be hit.

In order to solve this problem, the in-vehicle system 100 in the embodiment of the invention is realized in which the intersection area is identified, the traveling lane of the own vehicle in the intersection area is monitored only on the left lane marking, and the vehicle can pass through the intersection safely regardless of the behavior of the preceding vehicle turning right.

Figure 6:
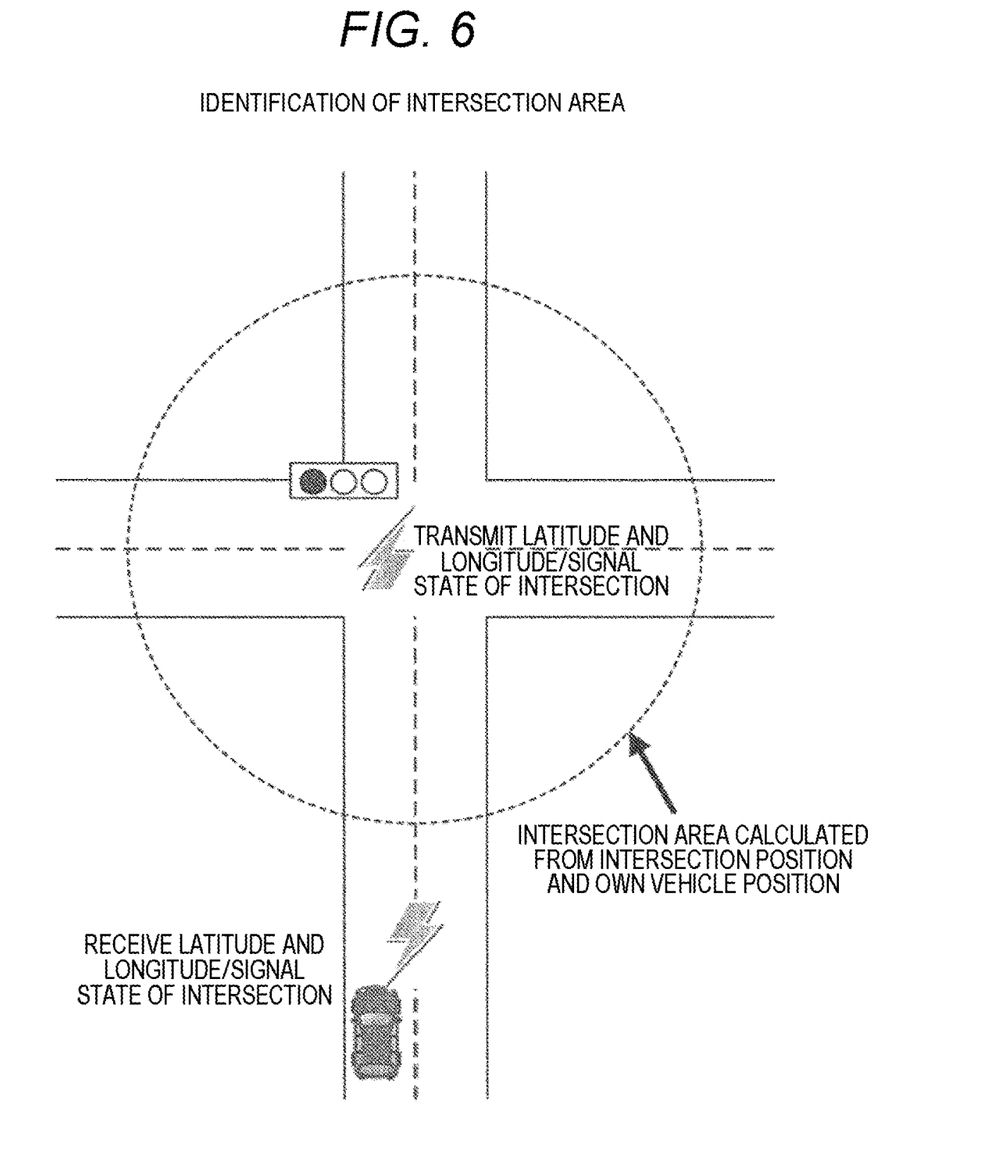
FIG. 6 is a diagram for explaining a method of identifying an intersection area.

FIG. 6 is an example of how to identify an intersection. The position information (latitude, longitude) of the intersection is distributed from the V2X (for example, V2I) roadside unit installed at a traffic signal of the intersection. The V2X in-vehicle unit mounted on the own vehicle calculates the intersection area from the position information of the intersection with the CPU 107 in FIG. 1 (for example, within a radius of 100 m from the center of the intersection). Next, the GNSS receiver of the own vehicle is used to determine whether the own vehicle has entered the intersection area.

Figure 7:
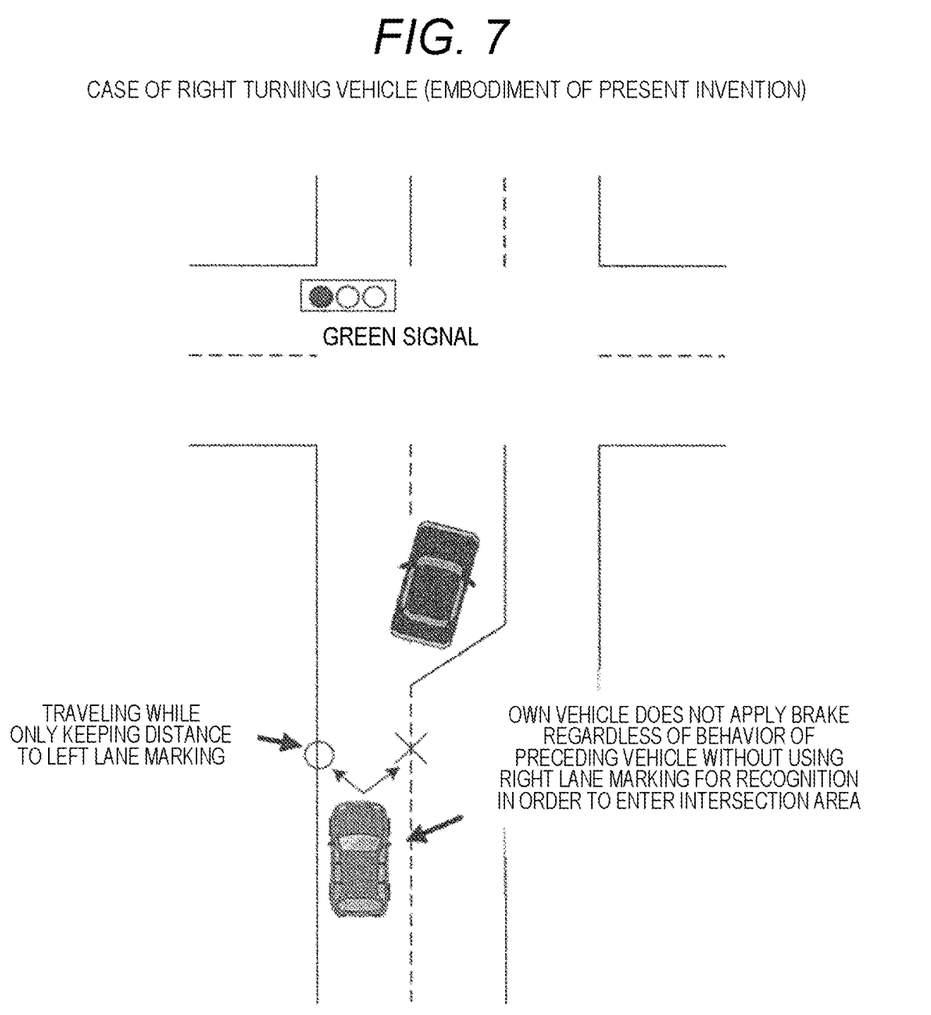
FIG. 7 is a diagram for explaining vehicle control according to this embodiment when the preceding vehicle turns right.

Next, the operation of the own vehicle in the intersection area will be described with reference to FIG. 7. The own vehicle, which is following a preceding vehicle by the ACC function, is always traveling while maintaining a constant inter-vehicle distance.

When approaching an intersection, the V2X in-vehicle unit of the own vehicle receives the intersection information (latitude, longitude) and calculates the intersection area as described above. The distance between the own vehicle and the intersection is always calculated, and it is always determined whether the own vehicle has entered the intersection. If the own vehicle enters the intersection area and loses sight of the right lane marking of the straight lane (traveling lane), it is determined that the preceding vehicle is moving to the right turn lane, and the own vehicle estimates a position within the traveling lane only with the information of the left lane marking of the straight lane to pass through the intersection.

If the right lane marking is not lost, it is determined that the preceding vehicle will pass straight through the intersection without turning right, and the vehicle will continue to follow.

As a result, the stable ACC operation can be realized even if there is a right-turning vehicle at an intersection.

Figure 8:
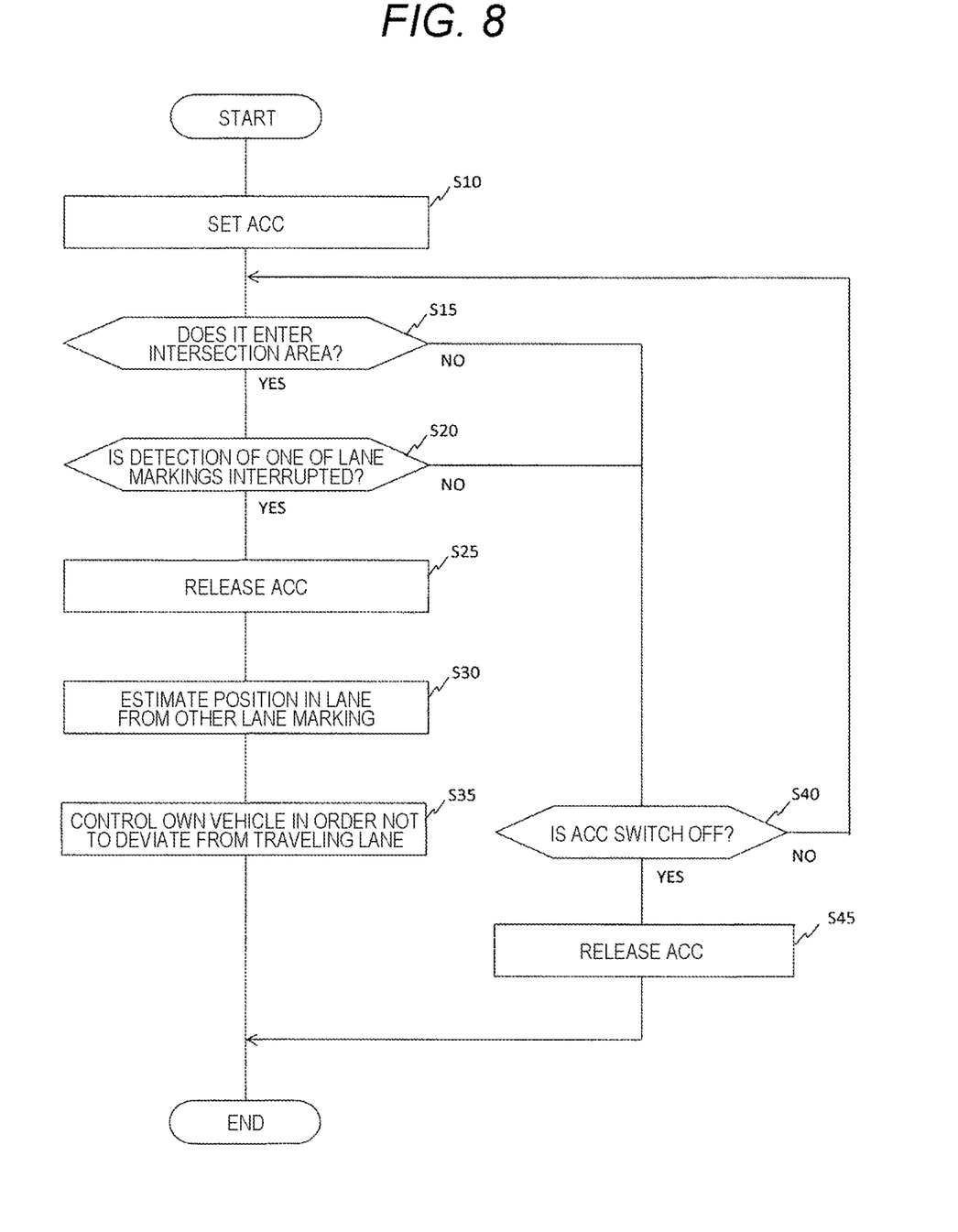
FIG. 8 is a flowchart illustrating a process of this embodiment executed by a CPU.

Next, the process executed by the CPU 107 will be described with reference to FIG. 8. FIG. 8 is a flowchart illustrating the process executed by the CPU 107.

The CPU 107 sets the ACC, for example, when the switch for starting the ACC (ACC switch) is turned on (S10). Then, the ACC will start. Here, the CPU 107 (processor) functions as a first control unit that controls the own vehicle 201 to follow the preceding vehicle 202.

The CPU 107 (determination unit) determines whether the own vehicle 201 has entered the intersection area (S15).

Specifically, for example, the CPU 107 (determination unit) determines that the own vehicle 201 has entered the intersection area when the position of the own vehicle 201 calculated by the GNSS receiver 104 (first receiver) is within a predetermined distance from the position of the intersection indicated by the intersection position information received by the V2X receiver (second receiver). Thereby, it is possible to determine whether the own vehicle 201 has entered the intersection area by using the intersection position information received from the roadside device.

When the storage device 109 stores map information indicating information of the map including the position of the intersection, the CPU 107 (determination unit) may determine that the own vehicle 201 has entered the intersection area when the position of the own vehicle 201 calculated by the GNSS receiver 104 is within a predetermined distance from the position of the nearest front intersection included in the map information. As a result, it is possible to determine whether the own vehicle has entered the intersection area by using the position of the intersection included in the map information.

When the CPU 107 determines that the own vehicle 201 has entered the intersection area (S15: YES), the CPU 107 determines whether the detection of one of the right and left lane markings of the traveling lane is interrupted (S20). On the other hand, when the CPU 107 determines that the own vehicle 201 has not entered the intersection area (S15: NO), the process proceeds to S40.

When the CPU 107 determines that the detection of one of the right and left lane markings of the traveling lane is interrupted (S20: YES), the CPU 107 releases the ACC that causes the own vehicle 201 to follow the preceding vehicle 202 (S25). On the other hand, when the CPU 107 determines that the detection of one of the right and left lane markings of the traveling lane is not interrupted (S20: NO), the process proceeds to S40.

In this way, when the detection of one of the right and left lane markings of the traveling lane is interrupted (S20: YES) after the own vehicle 201 has entered the intersection area (S15: YES), the CPU 107 (processor) functions as a second control unit that releases the ACC that causes the own vehicle 201 to follow the preceding vehicle 202.

It should be noted that the state in which the detection of the lane marking is interrupted can also mean that the detected lane marking is discontinuous.

As a result, even if the own vehicle 201 has entered the intersection area and then the preceding vehicle 202 changes lanes to the right turn lane or the left turn lane and decelerates, the own vehicle 201 does not decelerate in accordance with the preceding vehicle 202.

Here, when the detection of one of the right and left lane markings of the traveling lane is interrupted after the own vehicle 201 has entered the intersection area, the CPU 107 (second control unit) may notify that the ACC for making the traveling following the preceding vehicle 202 has been released through a display device or a speaker. As a result, if the preceding vehicle 202 changes lanes to the right turn lane or the left turn lane after the own vehicle 201 enters the intersection area, the user can confirm that the ACC for following the preceding vehicle 202 has been released.

The CPU 107 (second control unit) estimates the position in the lane of the own vehicle 201 from the other lane marking in the traveling lane (S30), and controls the own vehicle 201 so that the estimated position in the lane does not deviate from the traveling lane to pass through the intersection area (S35). As a result, the own vehicle 201 can travel in the traveling lane even if one of the lane markings in the traveling lane is blocked by the preceding vehicle 202 and cannot be detected.

The CPU 107 releases the ACC (S45), for example, when the ACC switch is turned off (S40: YES). On the other hand, the CPU 107 returns the process to S15 when the ACC switch remains on (S40: NO).

As described above, according to this embodiment, even if the own vehicle has entered the intersection area and then the preceding vehicle changes lanes to the right turn lane or the left turn lane and decelerates, it is possible to configure such that the own vehicle does not decelerate in accordance with the preceding vehicle.

(Modification)

Figure 9:
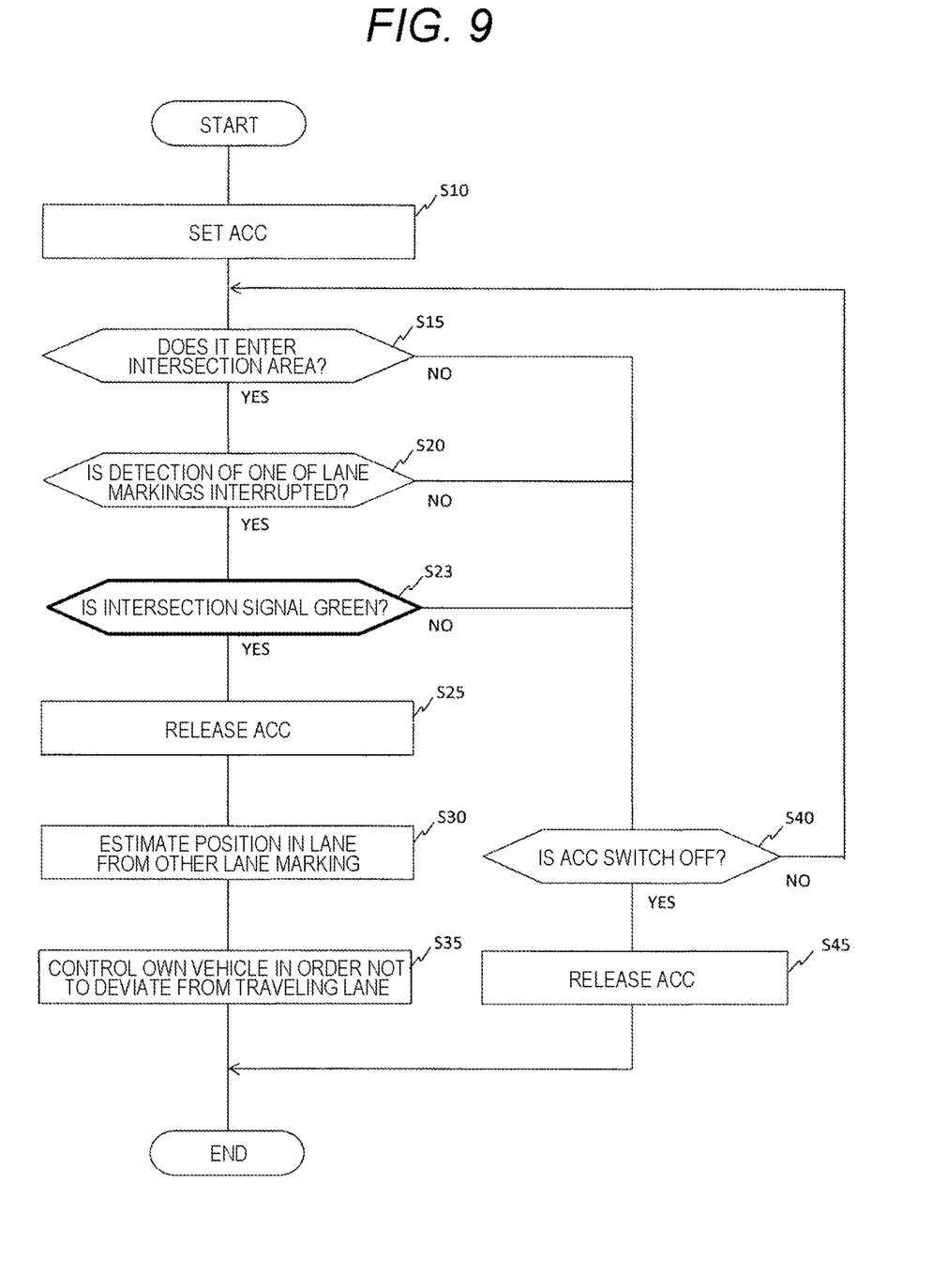
FIG. 9 is a flowchart illustrating a process of a modification executed by the CPU.

In FIG. 9, the process of S23 is added as compared with the flowchart of FIG. 8.

When the intersection signal is green (S23: YES), the CPU 107 releases the ACC that causes the own vehicle 201 to follow the preceding vehicle 202 (S25). On the other hand, when the intersection signal is not green (S23: NO), the CPU 107 proceeds to S40.

In this way, the detection of one of the right and left lane markings of the traveling lane is interrupted (S20: YES) after the own vehicle 201 has entered the intersection area (S15: YES). When the intersection signal is green (S23: YES), the CPU 107 (second control unit) releases the ACC that causes the own vehicle 201 to follow the preceding vehicle 202. As a result, even if the own vehicle 201 has entered the intersection area and then the preceding vehicle 202 changes lanes to the right turn lane or the left turn lane and decelerates, the own vehicle does not decelerate in accordance with the preceding vehicle when the intersection signal is green.

Instead of the process of S15, the CPU 107 (second control unit) may determine whether it is the period from when the own vehicle 201 enters the intersection area to when it reaches the intersection.

In this case, the CPU 107 (second control unit) interrupts the detection of one of the right and left lane markings of the traveling lane during the period from when the own vehicle 201 enters the intersection area until it reaches the intersection. When the intersection signal is green, the CPU 107 releases the ACC that causes the own vehicle 201 to follow the preceding vehicle 202.

As a result, even if the preceding vehicle 202 changes lanes to the right turn lane or the left turn lane and decelerates before the intersection, the own vehicle 201 does not decelerate in accordance with the preceding vehicle 202 when the intersection signal is green.

Further, the invention is not limited to the embodiments described above, but includes various modifications.

For example, the above embodiments have been described in detail for easy understanding of the invention, and the invention is not necessarily limited to having all the configurations described.

In the above embodiment, the explanation has been given in the right turn lane, but the explanation can also be applied to the left turn lane. In addition, this technology can be applied to parking lots as well as intersections. In addition, V2X is assumed to identify the intersection area, but the method of obtaining position information is not necessarily limited to this.

In FIG. 8, the processing order of S15 and S20 may be changed. Similarly, in FIG. 9, the processing order of S15, S20, and S23 may be changed.

In addition, a part or all of the respective configurations and functions may be realized in hardware by, for example, a designed integrated circuit. In addition, the respective configurations may be realized in software by interpreting and executing programs for a processor (CPU) to realize the respective functions. The information such as the programs, tables, files, and the like for realizing the respective functions can be placed in a recording device such as a memory, a hard disk, or a Solid State Drive (SSD), or a recording medium such as an IC card, an SD card, a DVD, or the like.

REFERENCE SIGNS LIST 100 in-vehicle system
101 GNSS antenna
10 V2X antenna 103 camera
104 receiver
105 transceiver
106 image processing circuit
108 brake control
109 storage device
110 in-vehicle camera system
201 own vehicle
202 preceding vehicle
203 following vehicle

The invention claimed is:

1. An in-vehicle control system, comprising:
an image processing circuit that detects lane markings of a traveling lane, the lane markings comprising first side markings and second side markings opposing the first side markings; and
a processor that controls an own vehicle to follow a preceding vehicle, the processor configured to:
determine that the own vehicle has entered an intersection area by detecting that the first side markings of the traveling lane are interrupted and the second side markings of the traveling lane are not interrupted,
in response to determining that the own vehicle has entered the intersection area, terminate control of the own vehicle to follow the preceding vehicle,
determine a distance in the traveling lane between the own vehicle and the second side markings, and
control the own vehicle to maintain the distance between the own vehicle and the second side markings while the own vehicle passes through the intersection area.

2. The in-vehicle control system according to claim 1, wherein the processor is further configured to:
determine an intersection signal of the intersection area is green; and
terminate control of the own vehicle to follow the preceding vehicle in response to (i) determining that the own vehicle has entered the intersection area, and (ii) determining the intersection signal is green.

3. The in-vehicle control system according to claim 2, wherein the processor is further configured to:
determine that the own vehicle has reached an intersection of the intersection area; and
terminate control of the own vehicle to follow the preceding vehicle in response to (i) determining that the own vehicle has entered the intersection area, (ii) determining the intersection signal is green, and (iii) determining that the own vehicle has reached the intersection of the intersection area.

4. The in-vehicle control system according to claim 1, wherein the processor is further configured to, in response to terminating control of the own vehicle to follow the preceding vehicle, notify that the control for following the preceding vehicle is terminated through a display device or a speaker,
wherein the processor determines that the own vehicle has entered the intersection area by (i) detecting that the first side markings of the traveling lane are interrupted and the second side markings of the traveling lane are not interrupted, and (ii) determining that a position of the own vehicle calculated by the receiver is within a predetermined distance from a position of a nearest front intersection included in the map information stored in the storage device.

5. The in-vehicle control system according to claim 1, comprising:
a first receiver that calculates a position of the own vehicle based on a radio wave received from a satellite; and
a second receiver that receives intersection position information indicating a position of an intersection from a roadside device,
wherein the image processing circuit detects the lane marking from an image captured by a camera, and
wherein the processor determines that the own vehicle has entered the intersection area by (i) detecting that the first side markings of the traveling lane are interrupted and the second side markings of the traveling lane are not interrupted, and (ii) determining that a position of the own vehicle calculated by the first receiver is within a predetermined distance from a position of the intersection indicated by the intersection position information received by the second receiver.

6. The in-vehicle control system according to claim 1, comprising:
a receiver that calculates the position of the own vehicle based on a radio wave received from a satellite; and
a storage device that stores map information indicating information of a map including a position of an intersection,
wherein the image processing circuit detects the lane marking from an image captured by a camera, and.

* * * * *